42-56.A AU 246 EA
3-4-75 OR RE28353
BEST AVAILABLE COPY
March 4, 1975 E. D. NYSTRAND ET AL Re. 28,353
WEB-WINDING APPARATUS AND METHOD
Original Filed Sept. 17, 1962 3 Sheets-Sheet 1
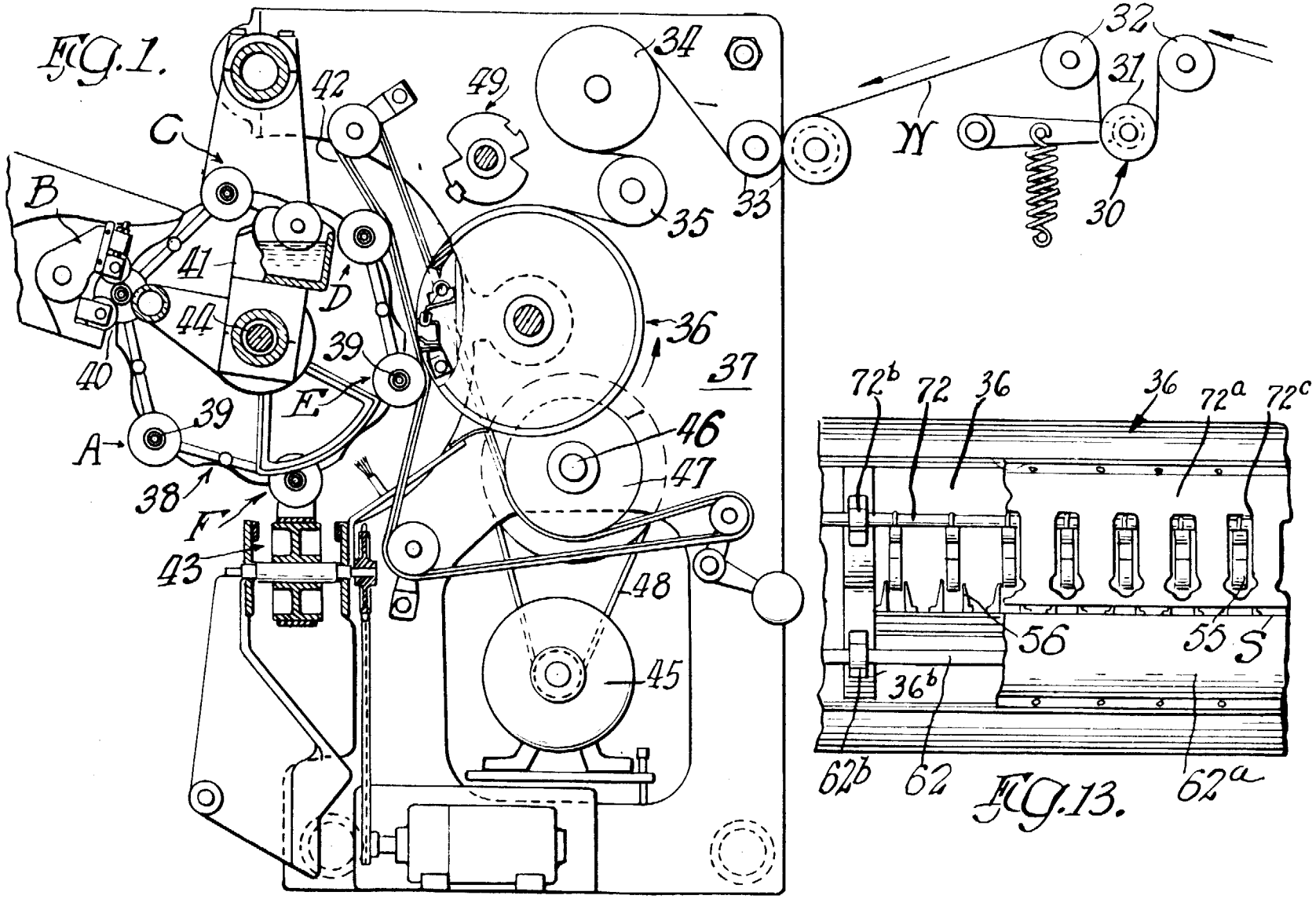

WEB-WINDING APPARATUS AND METHOD

Original Filed Sept. 17, 1962 8 Sheets-Sheet 2

WEB-WINDING APPARATUS AND METHOD
Original Filed Sept. 17, 1962 8 Sheets-Sheet 3
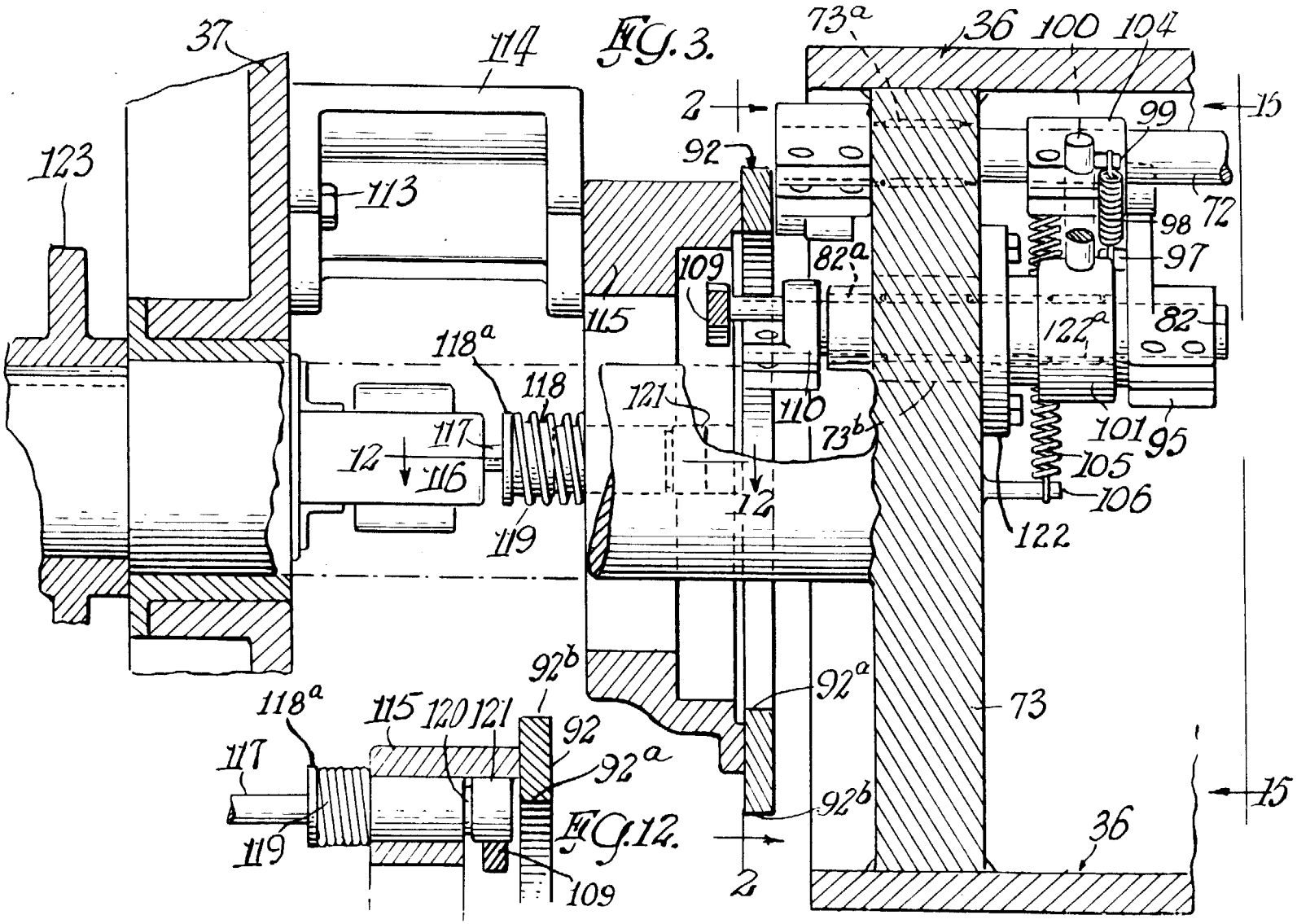

WEB-WINDING APPARATUS AND METHOD
Original Filed Sept. 17, 1962 8 Sheets-Sheet 4
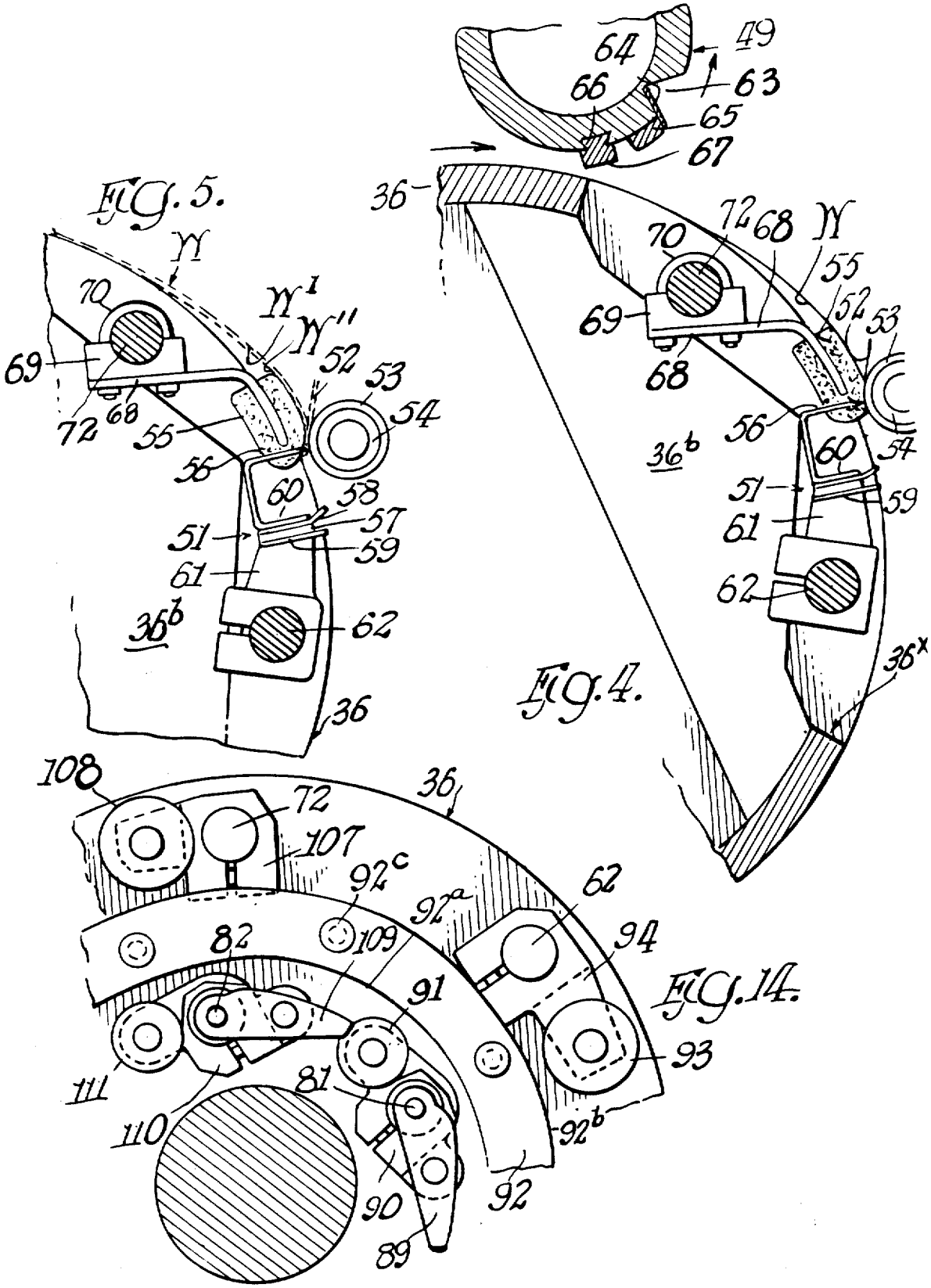

WEB-WINDING APPARATUS AND METHOD

Original Filed Sept. 17, 1962 8 Sheets-Sheet 5

WEB-WINDING APPARATUS AND METHOD
Original Filed Sept. 17, 1962 8 Sheets-Sheet 6
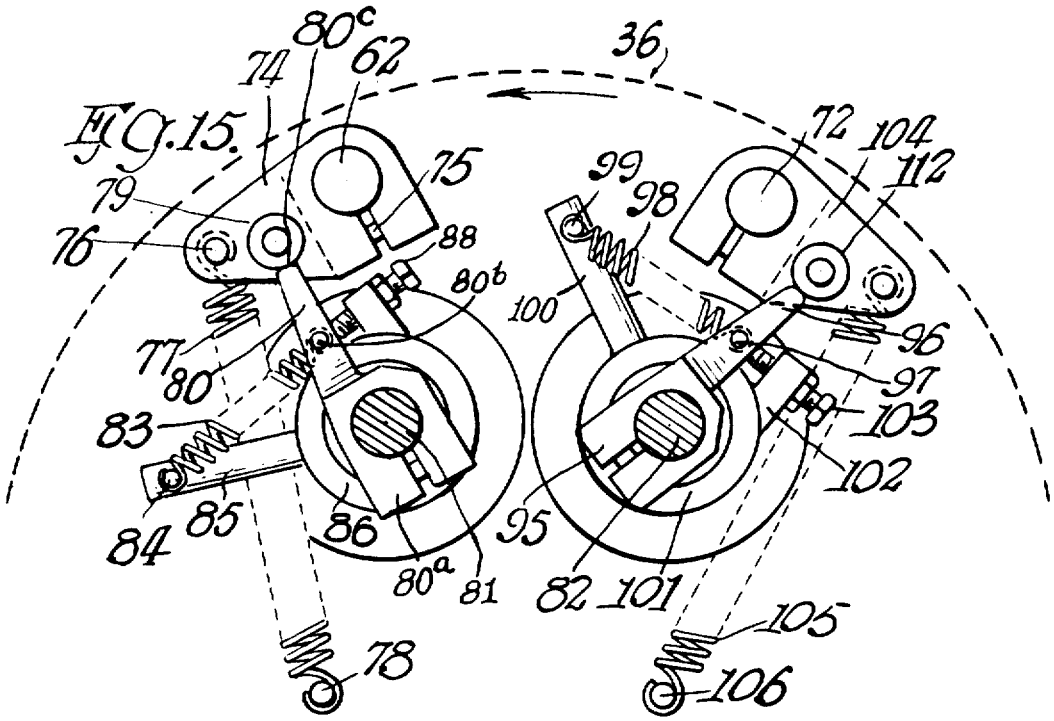
FIG. 15.
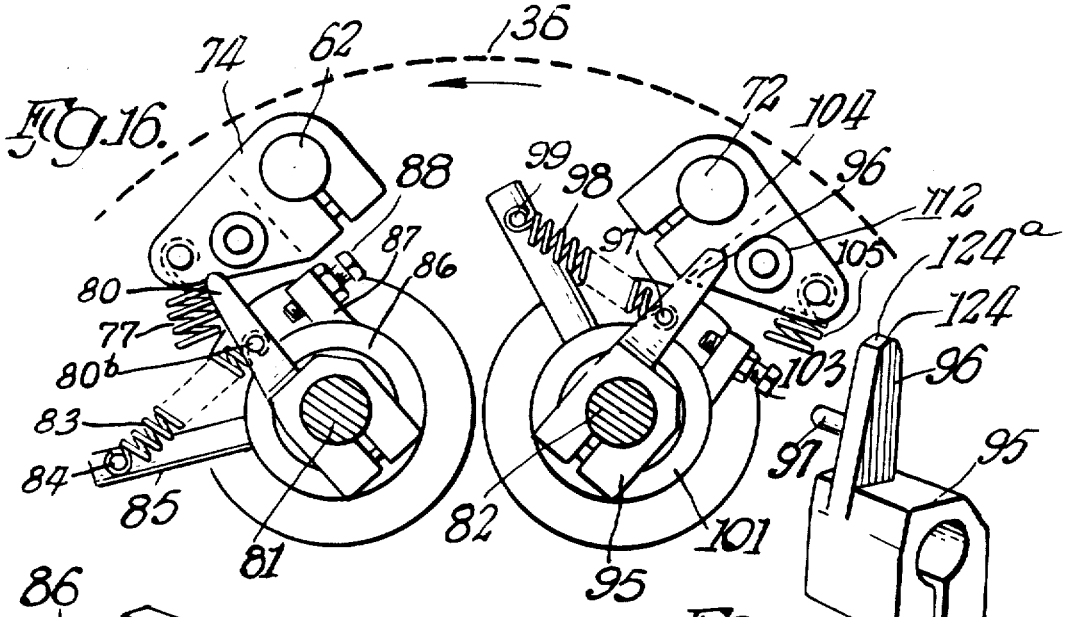
FIG. 16.
FIG. 18.
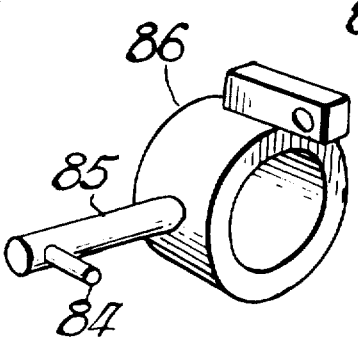
FIG. 17.

United States Patent

Re. 28,353
Reissued Mar. 4, 1975

28,353

WEB-WINDING APPARATUS AND METHOD

Ernst Daniel Nystrand, John J. Bradley, and Harvey J. Spencer, Green Bay, Wis., assignors to Paper Converting Machine Company, Inc., Green Bay, Wis.

Original No. 3,179,348, dated Apr. 20, 1965, Ser. No. 223,994, Sept. 17, 1962. Application for reissue Sept. 1, 1972, Ser. No. 285,877

Int. Cl. B65h *19/26*

U.S. Cl. 242—56 A 19 Claims

Matter enclosed in heavy brackets [ ] appears in the original patent but forms no part of this reissue specification; matter printed in italics indicates the additions made by reissue.

*ABSTRACT OF THE DISCLOSURE*

*An apparatus and method for rewinding a web-sequentially onto a plurality of core equipped mandrels is provided wherein the web is transversely served so as to present a folded free leading edge which is urged into contact with a core equipped mandrel.*

This invention relates to a web-winding apparatus and method and, more particularly, to that machine which paper converters refer to as an "automatic rewinder."

Web-winding apparatus of the character to which this invention is applicable can be sen in Kwitek and Nystrand Patent No. 2,769,600.

Apparatus of this character is employed when a wound web must be unwound and then rewound into smaller rolls. Illustrative of this operation insofar as paper is concerned is toilet tissue and paper toweling. The apparatus serves to unwind the large diameter paper rolls provided by the paper machine and thereafter rewind the web onto cores for individual use. The parent roll may be several feet in diameter, and it is desired to unwind this roll continuously and at a relatively high rate of speed—of the order of 2,000 feet per minute. From this, it can be seen that the rewinding operation wherein the web is presented ultimately in the form of small, readily handleable rolls, occupies only a few seconds.

Before the advent of the automatic rewinders, it was necessary to employ "stop-start" rewinders where the unwinding and rewinding operation was intermittent. The stopping was necessary in order for a new mandrel to be placed in the path of the web being unwound. The automatic rewinder solved this problem by automatically moving the new mandrel into the path of the web being unwound while the web was still being wound on another mandrel.

Conventionally, in the so-called automatic rewinders, the cut-off occurs at a position between adjacent mandrels. The rewinder may be equipped with six mandrels, each of which goes through the same orbital path. This permits the mandrel to be equipped with a paperboard core on which the tissue or toweling is wound, the core faced with glue, the actual winding, and ultimately the removal of the wound roll from the mandrel. Thus, near the end of rewinding on a given mandrel core, the subsequent mandrel is in a position close to the fast-traveling web so as to pick it up and continue the rewinding operation when the web has been severed. As pointed out before, it has been the conventional practice to sever the web between the mandrel which is just finishing its rewinding operation and the mandrel which is just to start its rewinding operation.

To achieve transfer of the web from the one mandrel to another, it was necessary to synchronize the cut-off with engagement of the web with the "new" mandrel—that mandrel just about to commence the web-winding operation. Also, the cut-off means had to be rapidly retracted so as not to interfere with the winding operation. With the advent of higher and higher speeds—of the order of 2,000 feet per minute—it became increasingly more difficult to effect this necessary synchronization. Also, the more rapid retraction of the cut-off means resulted in greater shock-type stresses being applied to the rewinder, raising the possibility of permature failure or misoperation.

Also, on multi-ply webs, only one ply is adjacent to the adhesive on the core and the other plys were not positively transferred to the new core by previously used mechanisms or means. This actually constituted a previously insurmountable speed barrier of approximately 1200 f.p.m. on 2-ply webs, and lower on webs of more than 2 plies.

From this, it can be appreciated that it would be desirable if the cutting of the web could be performed under conditions that lacked the criticality characteristic of the experient just mentioned, and the provision of method and apparatus for such cutting constitutes an important object of this invention.

Another object is to provide a method and apparatus for rewinding webs in which the severance of the web following a predetermined amount of rewinding is accomplished under conditions where the movement of the cutting means does not have to be precisely synchronized relative to a mandrel about to be wound and where the movement of the cutting member can be adjusted so as to minimize undersirable shock to the high speed rewinding apparatus.

Still another object is to provide a method and apparatus for rewinding webs on a series of mandrels each following the same path wherein the transverse severance of the web is performed on that portion of the web which approaches the mandrel next to be wound.

Yet another object is to provide a novel method and apparatus for the art of high speed rewinding, particularly of lightweight paper webs such as toilet tissue, toweling, etc., where the web is transversely severed at a position in its travel so as to present a free or unsupported leading edge approaching a mandrel about to start the winding operation and wherein a portion of the web spaced from the severed edge is urged into contact with a core-equipped mandrel.

A further object is to provide a novel apparatus in a high speed rewinder for selectively controlling, in a predetermined fashion, the elements used to effect cut-off and transfer of the webs relative to various rewinding mandrels.

A still further object is to provide a positive means for transferring multi-ply and particularly two-ply webs onto the new mandrel by trapping one ply in a fold of another ply, as by reverse folding the web. Other objects and advantages of the invention may be seen in the details of construction and operation set down in this specification.

The invention will be explained in conjunction with an illustrative embodiment in the accompanying drawing, in which—

FIG. 1 is a fragmentary side elevational view, partially in section, of an automatic rewinder employing the teachings of the invention;

FIG. 3 is a fragmentary vertical sectional view through an end part of the apparatus as taken along the line 3—3 of FIG. 2;

FIG. 4 is a fragmentary sectional view of the transfer portion of the apparatus at the time a winding cycle of a single-ply web is about to be initiated;

FIG. 5 is a fragmentary sectional view showing parts in FIG. 4 at the time a winding cycle of a two-ply web is about to be initiated.

FIG. 12 (Sheet 3) is a vertical detail fragmentary view through a portion of the solenoid trip-actuating plunger appearing in FIG. 3 as taken along the line 12—12 of FIG. 3, with the plunger in latch-tripping position;

FIG. 13 (Sheet 1) is a fragmentary detail view of parts of the apparatus, as viewed in the direction of the arrows 13—13 in FIG. 2, and which parts also appear on FIG. 10;

FIG. 14 (Sheet 4) is a fragmentary view in elevation of parts appearing in FIG. 2 when in a changed position;

FIG. 15 is a detailed vertical sectional view, as taken along the line 15—15 of FIG. 3, and more particularly shows a certain latching mechanism employed in the apparatus when the mechanism is in the latched position;

FIG. 6 is a view similar to FIG. 15 when the latching mechanism is in the unlatched position;

Figure 19:
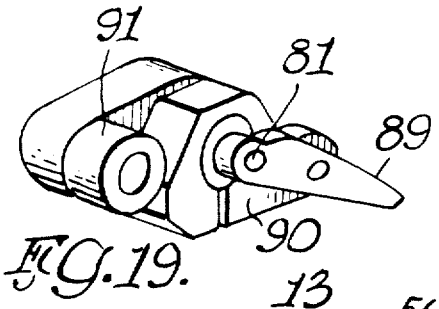

FIGS. 17 and 18 (Sheet 6) and FIG. 19 (Sheet 2), respectively, are detail perspective views of certain parts employed in the latching mechanism of the apparatus; and FIGS. 20–23 (Sheets 7 and 8) are schematic elevational views of the machine operation during the inventive sequence.

It is believed that a general description of the overall rewinder will be helpful in understanding the particular improvements set down herein, and for that purpose the following description is given:

General description of environmental rewinder

In the illustration given, and with particular reference to FIG. 1, the numeral 30 designates generally a tension control mechanism for the web W which includes a dancer roll 31 positioned between idler rolls 32 supported in the path of the web W from a parent or jumbo roll (not shown). Alternatively, the web W may come from a web-forming machine. Thereafter, the path of travel of the web W carries the web past and in contact with driven pull rolls 33, a perforator roll 34, and a slitter or idler roll 35. The perforator roll 34 advantageously may be of the type set forth in U.S. Patent No. 2,870,840. The rolls 33–35 are suitably journaled in a frame 37 which also carries the main cut-off bedroll 36, the bedroll 36 being partially wrapped also by the web W.

The numeral 38 designates generally a mandrel-equipped turret which is mounted for rotation in rewinder frame 37 and which is disposed in parallel, side-by-side relation with the bedroll 36. In the illustration given, the turret 3 is equipped with six mandrels 39, the mandrels being arranged for sequential movement into web-contacting relation.

In the operation of thhe turret 38, a core on which the web W is to be wound is inserted on the mandrel 39 in the station designated by the letter A. In the operational sequence, a mandrel 39 is rotated from the core-receiving station A into the core-cutting station B, where a plurality of axially-spaced cutting knives or discs 40 engage the core and cut it into predetermined lengths. Further rotation of the turret 38 brings a mandrel 39 to the station designated C, and a glue-applying mechanism 41 operates to provide each core segment with glue between the stations C and D. Still further rotation of the turret moves the mandrel into the station D, where the new mandrel is accelerated to transfer speed preparatory to transfer. In the station D, the mandrel 39 is engaged with the driving belt 42 and is accelerated to web speed. As the mandrel moves toward station E transfer occurs.

During movement from station E to station F, the mandrel 39 continues moving down and increasingly away from the bedroll 36. Prior to reaching station F, a discrete, predetermined length of the web has been wound and cut off, after which the mandrel arrives in position F, which is the finished roll-removing station.

Finished roll removal is achieved through the mechanism designated generally by the numeral 43, details of which, as well as of other structures not pertinent to this invention, can be seen in the above-mentioned patent. The intermittent operation of the turret 38 is achieved through a Geneva gear and other suitable mechanism (not shown), which indexes shaft 44. The mandrels 39 may be driven by the motor 45 through the belt 42 previously described. For this purpose, the frame 37 is equipped with a shaft 46 carrying a sheave 47 engaging the belt 42, the shaft being equipped with another sheave which engages the motor belt 48. The motor also drives the bedroll 36 through gearing not shown.

Inventive cut-off and transfer mechanism

The following constitutes a brief overall description of certain features of the invention to facilitate understanding of the detailed description set down later in this specification. For this purpose, reference will be had to FIGS. 20–23 (drawing Sheets 7 and 8).

Figure 21:
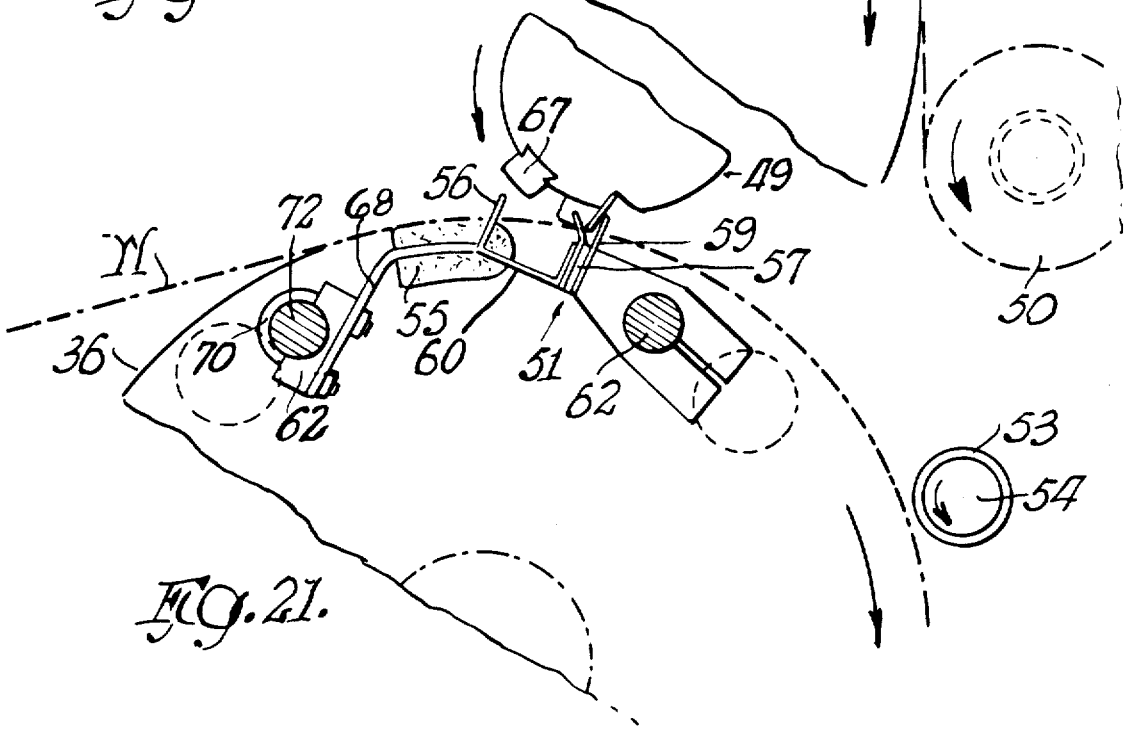
Figure 23:
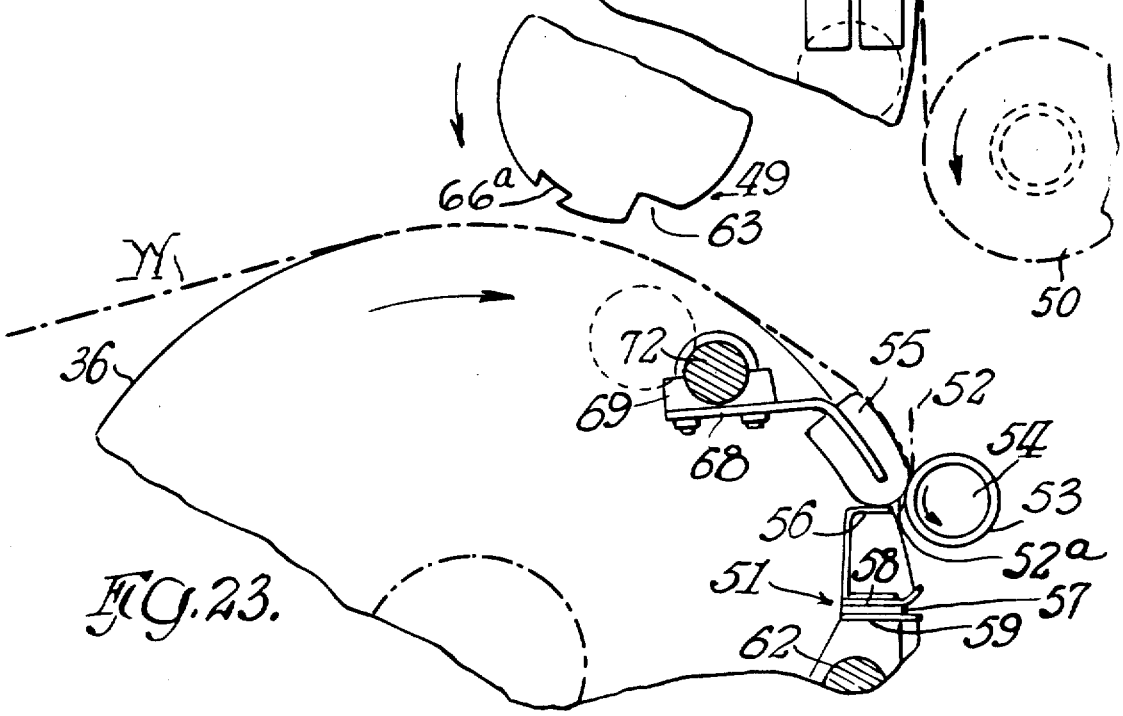

FIG. 21 (also FIG. 2 on Sheet 2) shows the condition of the bedroll 36 and chopper roll 49 near the end of a winding cycle, while FIG. 23 (also FIG 4 on Sheet 4) shows the condition of these two elements at the beginning of a subsequent winding cycle. When the bedroll 36 is travelling at 2,000 feet per minute surface speed, the FIG. 23 showing is about 0.03 second later than the showing in FIG. 21.

Figure 20:
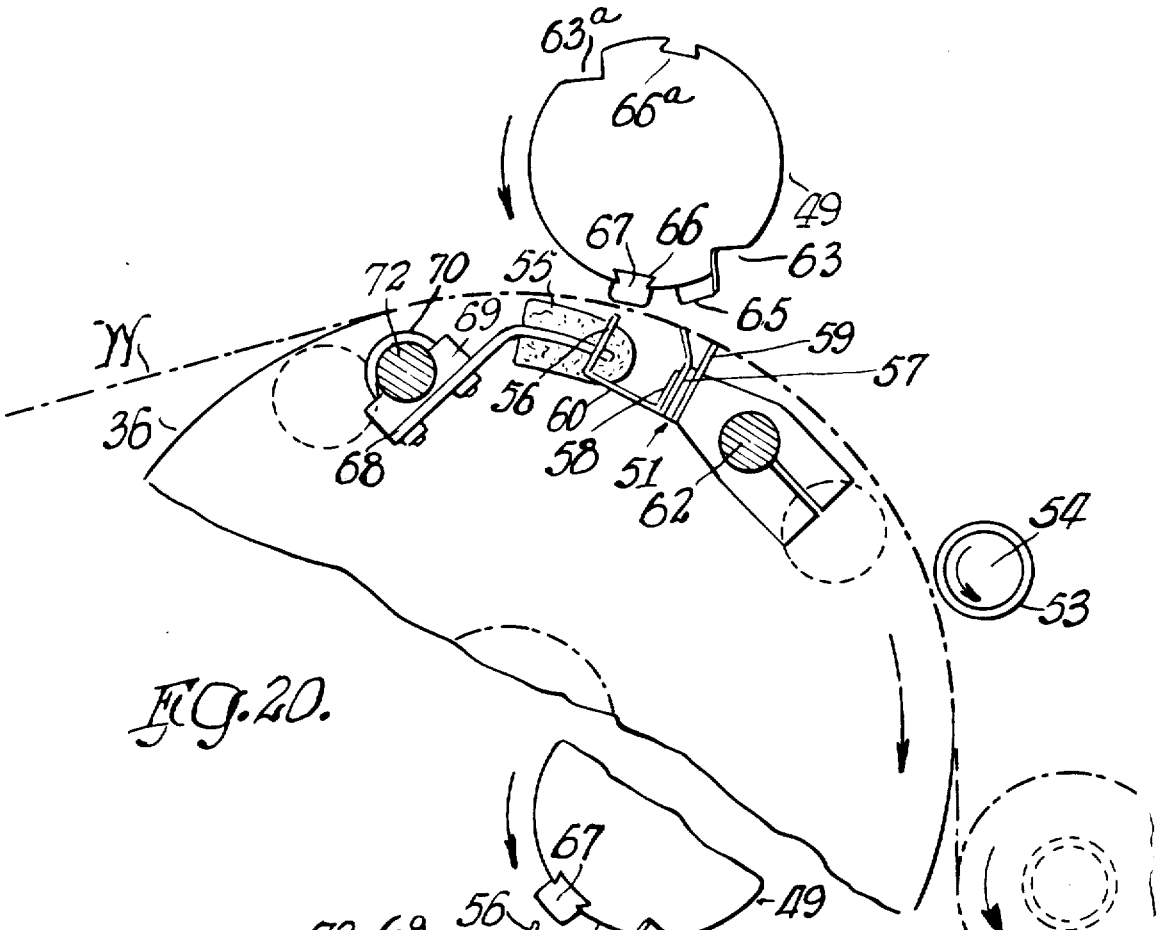
Figure 22:
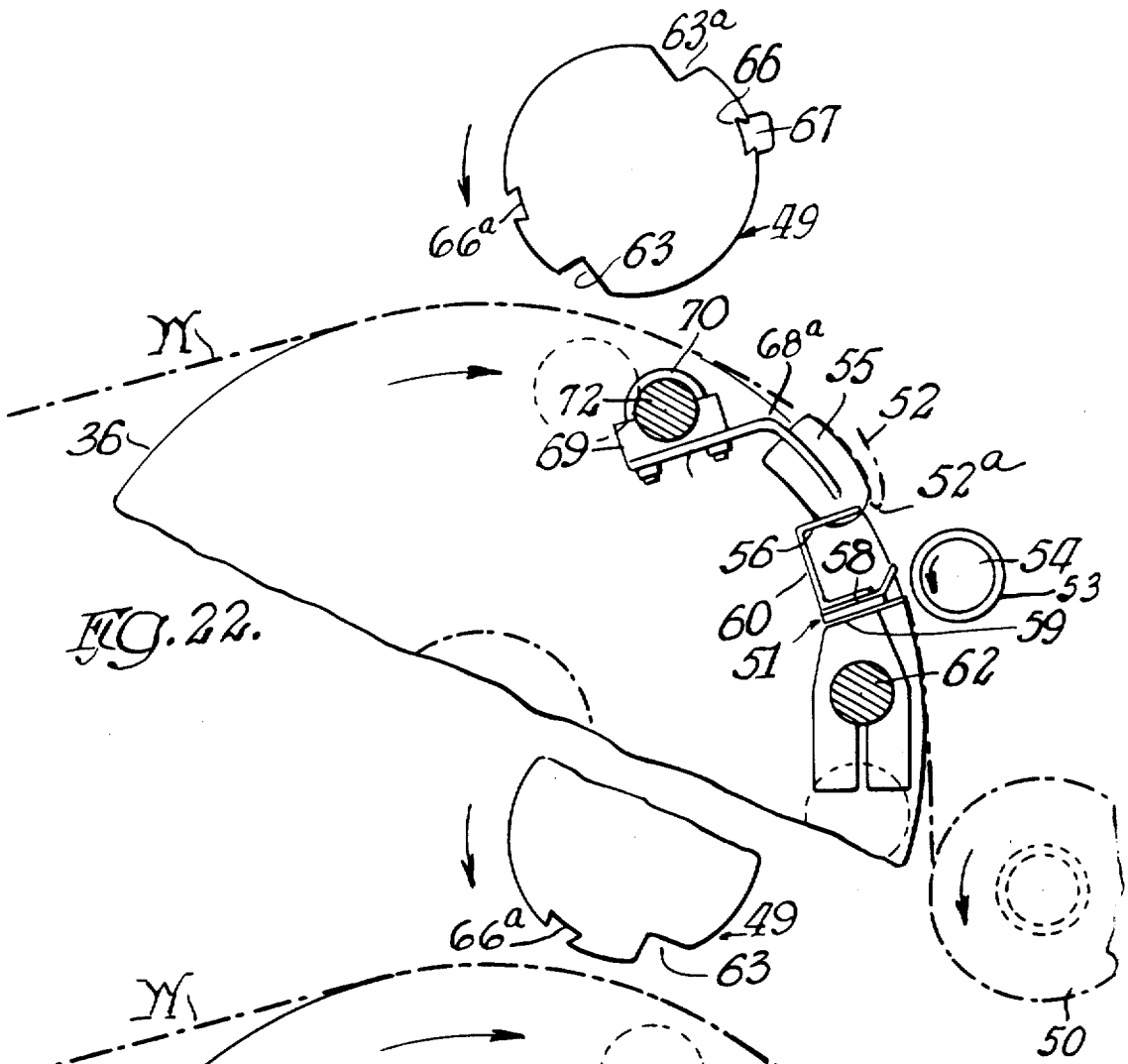

Referring now specifically to FIG. 20, it is seen that the web W is in the stage of winding onto roll 50. The web W in FIG. 21 is seen in the process of being severed by a knife mechanism generally designated 51 so as to provide a leading edge 52 which will fold back to form a folded edge to engage the core 53 mounted on a mandrel 54 in the next winding station. In FIG. 23 the folded edge 52a is seen in contact with the core 53 under the urging of a pad 55. In FIG. 22, the pad 55 is partially extended from the bedroll. Thus, it will be seen that the web W is severed well in advance of the time the leading edge of the severed web is opposite the "new" mandrel 54, and that at the time this folded edge 52a is opposite the new mandrel 54, the pad 55 urges the folded edge 52a against the glue-equipped core of the mandrel 54 (FIG. 23).

With the inventive construction, it is possible to utilize about 270° of one revolution of the bedroll 36 to operate the cut-off and transfer mechanism—it being seen in FIG. 23 that the extension of the knife mechanism 51 does not interfere with the winding of the web W on the "new" mandrel 54. In the studied contrast to this, the prior art mechanisms had to achieve cut-off and transfer in the very small angular distance between the mandrel 54 and the wound roll 50, as seen in FIG. 21.

A further important advantage accuring from the features of the invention just described is the unique ability to wind two-ply, or multi-ply, tissues as seen in FIG. 5. There, the parts are in the same operative condition as seen in FIG. 4, but are seen operating against a web generally designated W and made up of webs W′ and W″. The web W″ is seen to be trapped within the reverse fold provided by the leading edge 52 as it is urged against the core 53 of the "new" mandrel 54.

The detailed description of the illustrated embodiment can be conveniently set forth in terms of the "cut-off," which involves the knife mechanism 51 and the chopper roll 49, the "transfer" which involves the pads 55, and lastly the "timing" which selectively provides the two functions of cut-off and transfer, it being appreciated that the cut-off, for example, occurs only once every 60 revolutions of the bedroll 36 where a 600 "count" toilet tissue roll 50 is being developed. Notwithstanding the fact that the winding cycle is relatively long when compared with the time of cut-off, on an absolute basis, it is rather small—in the specific example referred to being less than seven seconds.

Cut-off mechanism

Figure 2:
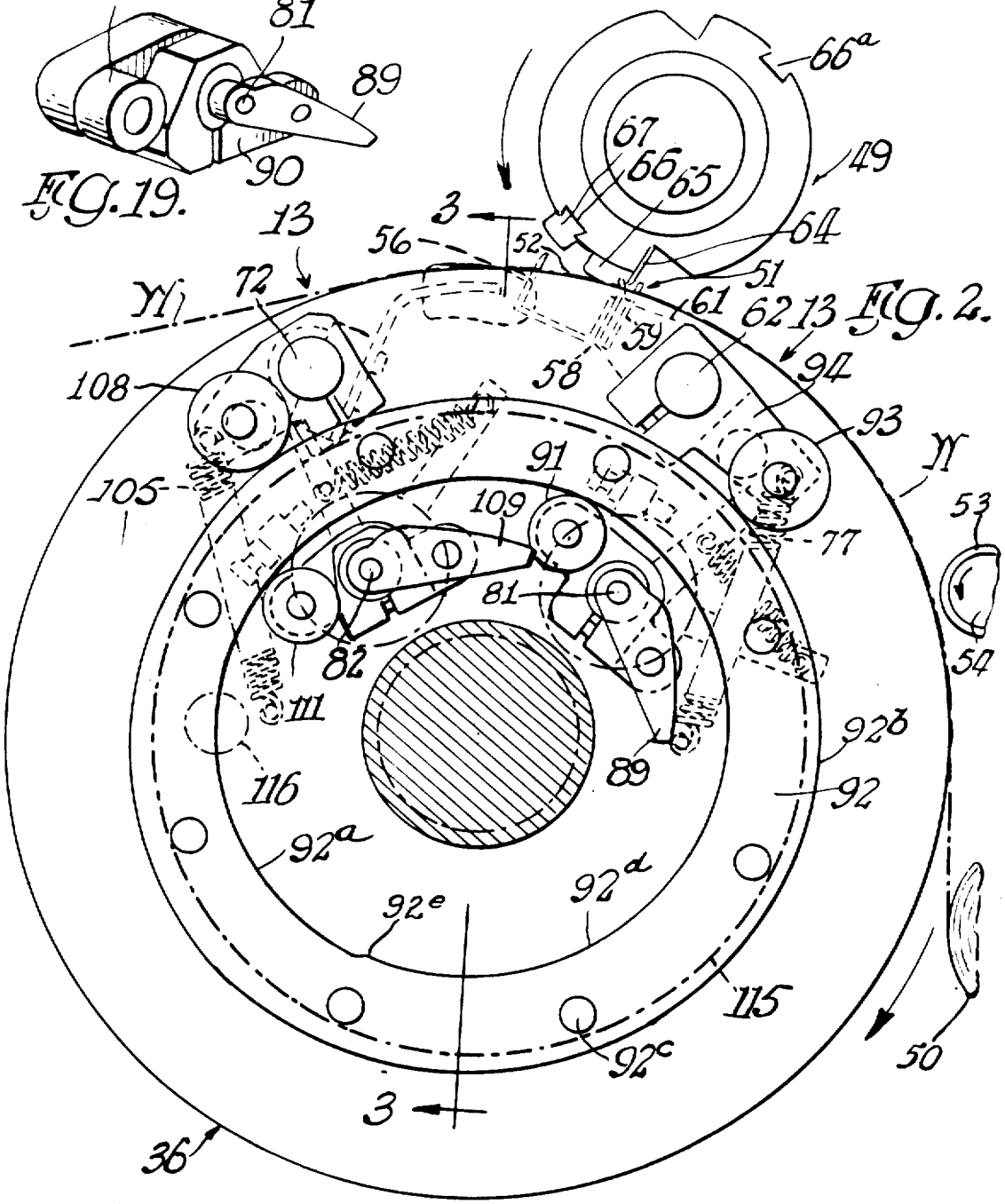
FIG. 2 is an enlarged fragmentary view, partially in elevation and in section, as taken along the line 2—2 of FIG. 3, of the web transfer portion of the apparatus (the large bedroll and the smaller chopper roll), at the time of completion of a winding cycle.

When the apparatus is in the FIG. 2 condition, transverse severing or "cut-off" of the web W is being achieved, the actual moment of severance being determined by the so-called "count" desired in the web roll 50. For different manufacturers and for different types of web material, this may vary. For example, with toilet tissue, the count may be 500, 650, 750, 1,000, etc. In the United States, the "count" refers to the number of squares of toilet tissue within the web roll, each square being 4½″ on a side. The high speed of production can be appreciated from the fact that a "20 wide" machine (i.e., 90″ wide), can produce upwards of 200 rolls per minute.

From this, it can be seen that the cut-off must be achieved in a very short time, and, as pointed out previously, the prior art performed this cut-off forwardly of the mandrel 54. Thus, there was provided a free leading edge of the web that was forward of the mandrel 54 at the time the mandrel 54 engaged the web W to commence its winding operation.

According to the instant invention, the cut-off is achieved prior to the time the web W reaches the transfer zone (i.e., before the knife mechanism 51 reaches mandrel 54), and this necessarily develops a free or unsupported leading edge on the web W when the same is approaching the new mandrel 54.

Through the use of the pins 56 (see FIGS. 2 and 10), the leading edges not not fly away from the bedroll to discontinue the rewinding operation, but develops a reverse fold configuration (see FIGS. 4 and 5), which facilitates the transfer. The development of the reverse fold configuration can be facilitated through the employment of other urging or maintaining means such as suction or vacuum ports.

In the illustrative embodiment, the knife mechanism (see FIG. 10) includes several axially-aligned bars or plates 57, each of which is equipped with longitudinally spaced holes (not shown) for the mounting of blades 58 and 59. The blade 58 optimally is constructed of cold roller steel 1/32″ thick by 1¼″ wide. The projecting edge portion 58a is inclined rearwardly 30° relative to the direction of rotation and the inclined portion in the illustration given is 7–16″ wide. The plate 59 is separated from the blade 58 by the plate 57 which is ⅛″ thick aluminum, and the blade 59 is constructed of 1/32″ thick by 1¼″ wide spring steel, the projecting edge 59a (see FIG. 10) being equipped with 12 serrations or teeth per inch, the teeth being designated by the numeral 59b in FIG. 10, and it is seen also that the trailing edge of the blade 59 is ground as at 59c and at an angle of about 60° to the plane of the blade 59. Along with the blades 58 and 59, the clip pins 56 are boltably secured to the plate 57, the pins 56 being provided as part of a U-shaped body generally designated 60 (as seen in side elevation, compare FIGS. 10 and 21). In the illustration given, each body 60 is 1 5/16″ wide (measured parallel to the length of plates 57), and the pins 56 constituting one arm of the U-shape are spaced 1⅜″ from the other arm, the pins 56 tapering to a 1/32″ point.

The plate 57 is carried by a plurality of holders 61 which are fixed to an axially-extending shaft 62. The shaft 62 is journaled within the ends of the bedroll 36 for selective rotation so as to extend the knife blades 58 and 59 and the pins 56 beyond the surface of the bedroll, the bedroll 36 being equipped with an opening in an opening in the surface thereof, as can be appreciated from a consideration of FIGS. 4, 8 and 9, the open portion of the bedroll being designated 36x.

Figures 6, 7, 8, 9, 10, 11:
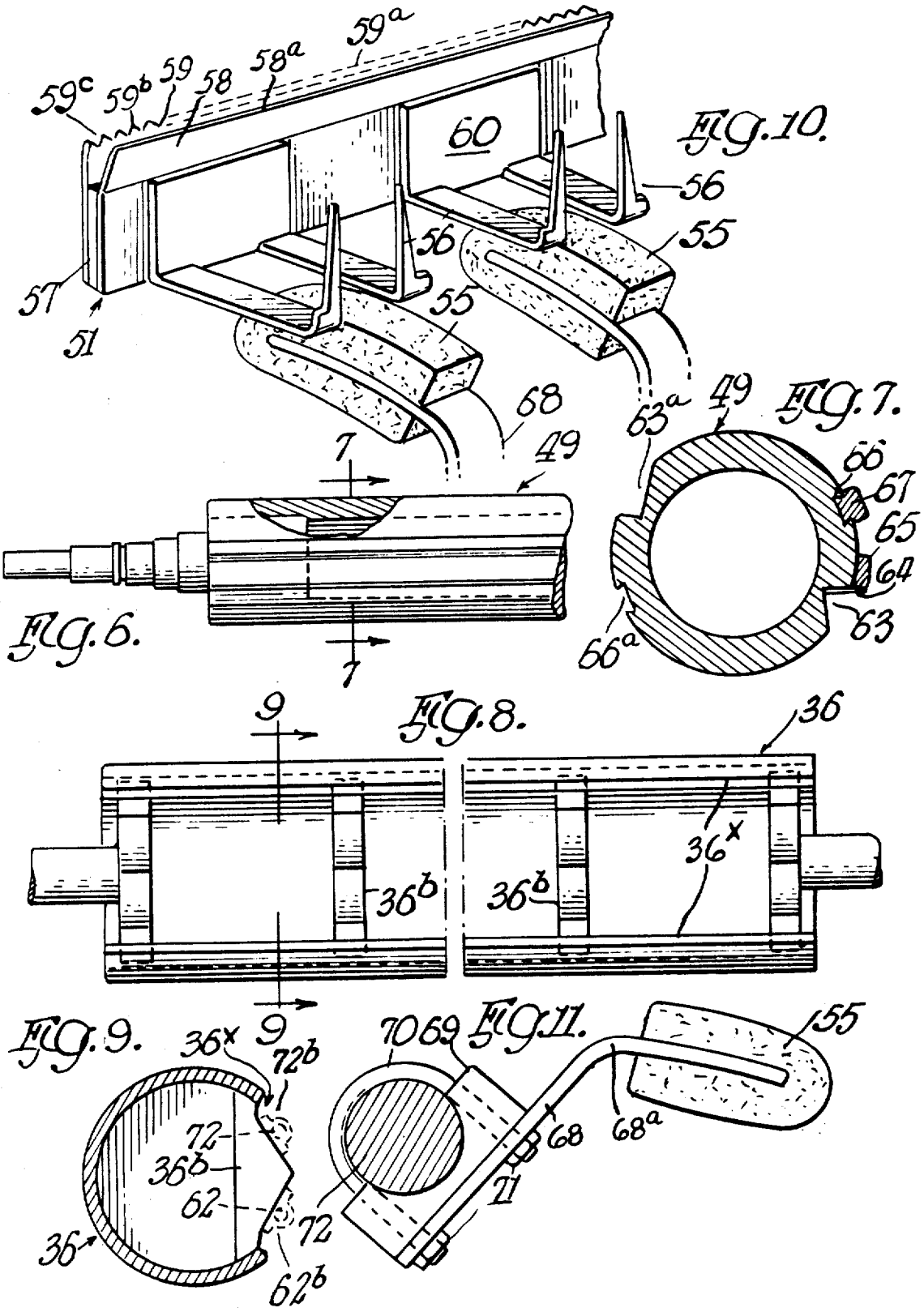
FIG. 6 is a view in side elevation of a portion of the chopper roll of the apparatus on a scale reduced from that shown in FIG. 7.
FIG. 7 is a transverse vertical sectional view through the chopper roll as taken along the line 7—7 and in a scale enlarged over that of FIG. 6.
FIG. 8 is a view in elevation of the bedroll of the apparatus as viewed from the open side of the bed roll and more particularly showing the bracing for the open side, the scale of FIG. 8 being considerably less than that of the roll appearing in FIG. 3.
FIG. 9 is a transverse vertical sectional view through the bedroll as taken along the line 9—9 of FIG. 8 and on the same scale.
FIG. 10 is a fragmentary perspective view of portions of the bedroll web-transferring mechanism of the apparatus appearing in FIG. 4 but in a changed position.
FIG. 11 is a view in side elevation of one of the pad-carrying members employed in the apparatus and the mounting therefor, on a scale enlarged over that of FIG. 4.

The knife mechanism 51 operates in conjunction with the chopper roll 49, which is also journaled in the frame 37 for cooperative rotation with the bedroll 36. The roll 49, as best seen in FIG. 7, is equipped with a longitudinally-extending knife mounting slot 63, and the knife which is boltably secured within the slot is designated 64 and is seen to project outwardly beyond the periphery of the cylindrical surface of roll 49. The knife blade 64 is backed by a snubber 65 which advantageously can be constructed of polyurethane foam backed with pressure-sensitive tape. Still referring to FIG. 7, it is seen that the periphery of the roll 49 is relieved as at 66 for the receipt of a polyurethane foam pin-impinging element 67. Alternatively, the element 67 may be combined with the snubber 65 as a single piece of foam adhesively secured to a relieved portion of the roll 49. The roll 49 may be equipped with recesses 63a and 66a (see FIG. 7) to balance the roll, these recesses being diametrically opposed to recesses 63 and 66, respectively, and being somewhat smaller to compensate for the elements 64 and 67. The elements 67 cooperate with the pins 56 in insuring proper perforation of the web W by the pins 56 so as to develop the reverse folded leading edge of the web W.

In the operation of the knife blades 58, 59 and 64, it will be appreciated that the web W is impaled upon the teeth 59b, while the inclined edge 58a operates against the snubber 65 to also anchor the web W transversely across the bedroll. Thus, the chopper roll knife blade 64 operates to apply a tension to the web held at longitudially spaced lines, and ruptures the same. The web is adjusted relative to the knife blades 58, 59 and 64 so that a line of transverse perforation provided by the shear cut unit 35 lies between the blades 58 and 59. This line of weakness, therefore, develops the line of rupture under the pressure imposed by the chopper roll blade 64.

Transfer mechanism

The pads 55, as best seen in FIG. 10, operates between the projecting fingers or pins 56 and are mounted on holders 68 (see FIG. 11). Each pad 55, as illustrated, is a ½″ wide by ¼″ thick polyurethane foam piece, folded on the end of and adhesively secured to the arm 68a. The holders 68 are advantageously constructed of ⅛″ x ⅝″ aluminum and are angularly deformed as at 68a. One leg of the holder 68 is secured against a clamp member 69 by means of a U-bolt 70 suitably equipped with nuts 71. The U-bolt 70 extends around a rocker shaft 72, which is journaled in the bedroll in the same fashion as the rocker shaft 62 for the knife mechanism 51. In similar fashion, the pads 55 are projectable or extensible out of the openings 36a in the surface of the bedroll 36, the bedroll 36 being suitably braced as at 36b across the opening 36x (see FIGS. 8 and 9).

As can be appreciated from a consideration of FIG. 13, the openings 36a are partially covered by means of coverplates 62a and 62b. The coverplate 62a overlies the portion of the openings 36a radially aligned with the knife shaft 62, while the coverplate 62b overlies the pusher pad shaft 82, these shafts being suitably rotatably supported in bearing blocks 72b and 82b supported on the cross braces 36b, as seen in FIGS. 13 and 9. Each transfer pad 55 is associated with an opening 82c provided in the coverplate 72a (see FIG. 13), while the spacing for the two coverplates 62a and 72a provide an elongated slot S through which the knife blades 58 and 59 issue.

At the time of transfer, as seen in FIGS. 4 and 5, the pad 55 projects out of the bedroll opening 63 to urge the reversely folded web against the mandrel 54 so as to initiate a new winding cycle.

Timing mechanism

The mechanism for extending and retracting the knife mechanism 51 and the pressure pads 55 includes a camming system, selectively energized at the end of a given winding cycle, i.e., during the 60th revolution of the 45" circumference bedroll 36 when a 600 count roll 50 is being produced. It is believed that the basic camming and latching mechanism (for the other 59 revolutions) can be most readily appreciated from a consideration of FIGS. 15 and 16 (Sheet 6), and hence reference will be made to those views.

In each view, it is seen that again the rocker shafts are designated 62 and 72, respectively, for the knife mechanism and the transfer pads, the rocker shaft 72 also being seen in FIG. 3 where it is journaled in the bedroll head 73 in needle bearings 73a. First, however, with respect to the rocker shaft 62, it is seen that the shaft is equipped with a spring arm 74. The arm 74 is rigidly clamped about the rocker shaft 62 by means of a bolt 75. The spring arm 74 is equipped with post 76 which provides a mounting for a coiled spring 77 which, at its other end, is mounted on a post 78 provided as part of the inside of the bedroll end head 73. Thus, the spring 77 tends to pivot the spring arm 74 in a counterclockwise fashion about the axis of shaft 62, except for the holding action of the latching mechanism, which will now be described.

For the purpose of latching the spring arm 74 in the FIG. 15 configuration, the latching mechanism includes a trip latch member 80 which bears against a cam follower 79 mounted is spring arm 74 (see FIG. 15). The trip latch member 80 is rigidly clamped on a cam latch shaft 81 by means of a block portion 80a. Unlike the rocker arms 62 and 72, the cam latch shaft is relatively short, being journaled in the bedroll end head 73 in a fashion analogous to the cam latch shaft 82 as seen in FIG. 3 and associated with the transfer pad mechanism. In FIG. 3, the shaft 82 is mounted in needle bearings 73b provided in the header 73 of the bedroll 36. Here, it will be appreciated that FIG. 3 reflects only a portion of the timing mechanism, primarily that associated with the transfer pad mechanism seen on the left-hand side of FIG. 2. However, the latching and camming mechanism for the knife mechanism 51 is similar to the camming and latching mechanism for the transfer pads 55.

Referring again to FIGS. 15 and 16, it will be seen that the trip latch member 80 is urged out of engagement with the cam follower 79 by means of a spring 83. For this purpose, the spring 83 is secured at one end to a post 80b provided as part of the trip latch member 80, and at the other end to a post 84 provided on an arm portion 85 which is integral with the trip cam housing collar 86. The collar 86 is seen in perspective in FIG. 17 and is fixed relative to the frame 37 so that the shaft 81 can rotate relative thereto (compare FIGS. 15 and 16). The collar 86 is equipped with a second arm or projection 87 carrying a screw 88 which serves to limit the return of the trip latch 80 to its latched position as seen in FIG. 15.

The remaining structure associated with the cam latch shaft 81 can be seen in FIGS. 14 and 19. There, it is seen that a trip cam 89 is fixed to a trip cam arm 90, which in turn is secured to the shaft 81. The trip cam arm 90 carries a cam follower roller 91 which, when the shaft 81 rotates to the FIG. 16 condition, follows the contour of the inside cam surface 92a of cam 92 (see FIG. 2).

When the shaft 81 is in the FIG. 16 condition, the shaft 62 is likewise in its FIG. 16 condition by virtue of the action of the spring 77 so as to position the cam follower 93 in contact with the exterior cam surface 92b (see FIGS. 2 and 14). The cam member 92 (see FIG. 3) is secured to the frame 37 by bolts extending through bolt holes 92c. The cam follower 93 is carried by a cam follower arm 94 rigidly fixed to the shaft 62.

Before describing the operation of the cut-off timing cams, etc., a detailed description of the transfer camming mechanism will be given, along with the means for actuating both sets of camming mechanisms.

Referring first to FIG. 15, it will be seen that the numeral 82 designates the cam latch shaft (being the counterpart of shaft 81 for the cut-off mechanism). The shaft 82 has fixed thereto a trip latch block 95a providing trip latch arm 95 (see FIG. 18) equipped with a projecting arm portion 96 which performs the same function in the transfer mechanism that the trip latch 80 does in the cut-off mechanism. The arm 96 is equipped with a laterally-extending post 97 which secures one end of a spring 98, the other end of which is fixed to a post 99 carried by an arm 100 provided as part of a trip cam housing collar 101. The housing 101 is similar to the housing 86 seen in FIG. 17 and carries a second arm projection 102 in which is threadedly received a stop screw 103.

The shaft 72 which carries the transfer pads 55 and the arms 68 therefor is equipped with a spring arm 104, the arm 104, and hence the shaft 72, being urged in a clockwise fashion by means of a spring 105. The spring 105, at its other end, is secured to a post 106 analogous to the fashion of securement of the spring 77 (see also FIG. 15).

Additionally, as can be seen in FIG. 14, the shaft 72 carries a cam follower arm 107 rotatably supporting a cam follower 108. The cam follower 108, like the cam follower 93, rides against a cam surface provided fixed on the frame 37.

Completing the elements in the camming mechanism for the transfer portion of the apparatus, the numeral 109 designates a trip cam which is fixed to the shaft 82 and which is supported on a trip cam arm 110 (still referring to FIG 14) and which carries a cam follower 111. Also, as in the case of the cut-off mechanism, a cam follower is provided on the spring arm. In the case of the transfer mechanism, the cam follower is designated 112 and is rotatably mounted on the spring arm 104.

Turning now to FIG. 3 (Sheet 3), a transverse section of the machine through the transfer camming mechanism is seen. The numeral 37 again designates the main frame of the machine, and seen bolted to the frame as at 113 is a bracket 114. The bracket 114 in turn supports a bearing housing 115, so that the housing 115 is spaced between the inside of the frame 37 and the header 73 of the bedroll 36. The housing 115 carries the cam 92 which provides the outer contour 92b (see FIG. 2) for engagement by the cam followers 93 and 108, the cam 92 providing an inner surface 92a engageable by the cam followers 91 and 111.

Also supported on the frame 37 is a solenoid 116 (see FIG. 3), which is seen in its two conditions in FIGS. 3 and 12. In FIG. 3, the solenoid is positioned so as not to actuate the trip cams 89 and 109, while in FIG 12 the position for tripping the two cams 89 and 109 is seen. Referring to FIG. 12, the solenoid is seen to be equipped with an armature 117 which operates against a cap 118. Interposed between the shoulder 118a of the cap 118 and the bearing housing 115 is a coiled spring 119. The cap 118 carries a cam follower shaft 120. At its extended end, the shaft 120 carries a cam follower 121 which in FIG. 12 is seen to be in engagement with the trip cam 109. The trip cam 109 is also seen in FIG. 3 and is seen to be fixed to cam latch shaft 82, which is journaled in the trip cam shaft housing bracket 122 bolted to the bedroll header 73. As seen in FIG. 14, the numeral 110 designates the trip cam arm also seen in FIG. 3, and the numeral 101 designates the trip cam housing collar which is fixed to the bracket 122. The collar 101 is equipped with the post 100 and the spring 98 connecting the post 100 as at 99 with the pin 97 provided on the latch trip 95 is also seen. The spring arm 104 in FIG. 4 is seen to be mounted on the shaft 72, and this is biased by means of spring 105 which is connected to the header by means of pin 106.

Operation of timing mechanism

In the operation of the camming mechanism just described, the sequence is started by energization of the solenoid 116. this occurs when the bedroll blades 58 and 59 are opposite the chopper roll blade 64, and one revolution of the bedroll 36 prior to the desired cut-off. This can be conveniently achieved through a counting mechanism (not shown) synchronized with the drive gear 123 (see FIG. 3) which is provided as part of the bedroll 36.

Upon energization of solenoid 116, the armature 117 moves to the FIG. 12 position and the cam follower 121 is thereby aligned with the trip cams 89 and 109 associated with the cut-off and transfer mechanisms, respectively (see particularly FIG. 14). As the bedroll continues to rotate, the trip cams 89 and 109, in that order, strike the cam follower 121. The trip cams 89 and 109 are thus moved in a clockwise fashion from the FIG. 14 configuration to the FIG. 2 condition, turning the shafts 81 and 82 correspondingly. This results in the cam followers 91 and 111 riding on the inner surface 92a of the cam 92.

The clockwise movement of the shafts 81 and 82 necessarily disengages the trip latches 80 and 95 from the cam followers 79 and 112, respectively, converting the apparatus from the FIG 15 showing to the FIG. 16 showing. In this connection, it will be noted that FIGS. 15 and 16 are opposite hand to the showing in FIGS. 2 and 14. It is seen that the end 124 of the arm 96 (and also the arm of latch 80) is "peaked" (FIG. 18) to provide an over-center latching action, the follower 112, for example, bearing against the surface 124a during the latched position.

As the trip latches 80 and 95 are moved, the spring arms 74 and 104 and, therefore, the shafts 62 and 72, respectively, are rotated under the urging of springs 77 and 105. For this purpose, compare the positions of spring arms 74 and 104 in FIGS. 15 and 16. This movement results in the cam followers 93 and 108 being pivoted into contact with the exterior surface 92b of cam 92.

At this juncture, the apparatus is prepared for cut-off and transfer. After these two operations have been performed, relatching of the two mechanisms is in order for the ensuing winding cycle. This occurs through the vehicle of the cam followers 91 and 111 following the contour 92a of the cam 92, which is equipped with a latching surface 92d terminating in a step 92e (see FIG. 2).

Referring to FIG. 2 in particular, the numeral 115 (applied at the lower right) indicates the outline of the frame member supporting the cam 92 away from the main frame 37 and close to the bedroll 36, and it is seen that the cam surfaces 92a and 92b are concentric to the bedroll axis, with the cam maximum rise being at the bottom of the view. The portion 92d of the inner cam surface 92a is increasingly spaced from the housing periphery (the dotted line designated 115) until the drop-off point 92e is reached. When the cam follower 91, for example, engages the portion 92d, it is caused to move inwardly, i.e., toward the center of the bedroll 36. At this stage, the cam assembly, particularly the shaft 81, is in the condition seen in FIG. 16. Again, it should be understood that FIGS. 15 and 16 are views taken in opposite directions from FIGS. 2 and 14, for example. In FIGS. 2 and 14, the viewer is looking into the bedroll from the outside, while in FIGS. 15 and 16 the view is from the inside of the bedroll looking axially outwardly. Thus, the movement of the cam follower 91 inwardly results in a counterclockwise rotation of the shaft 81 in FIG. 2 or FIG. 14, but a clockwise rotation in FIG. 16. As the peak point 92e of the cam is reached, the trip latch arm 80 is positioned as seen in FIG. 15 and engaged with the cam follower 79 associated with the knife mechanism shaft 62. Meanwhile, the cam follower 93 has been following the surface 92b and has pivoted the shaft 62 to position the cam follower 79 for engagement with the face 80c of the peaked arm 80 (see FIG. 15). This engagement lifts cam follower 91 so as to space follower 91 from the cam surface 92a during the latched condition, i.e., the configuration seen in FIGS. 14 and 15.

Precisely the same operation is followed relative to the cam follower 111 associated with the rocker shaft 82 so as to latch the shaft 72 (associated with the transfer pads) into a retracted condition.

Still referring to FIG. 2, and comparing the same with FIG. 23, it will be seen that the arcuate distance between the point of trip of the trip cam 109 by the solenoid 116 to the point of maximum projection is about 135°. When this happens (i.e. tripping), the cam follower 108 falls a matter of about 0.002", i.e. moves inwardly, and then gradually moves further inwardly over the 135° arc to extend the transfer pads associated therewith. The same action has previously occurred relative to the knife mechanism 51. The cam and trip arrangement presented here means that centrifugal force has little or no effect upon the operation of the latching and unlatching mechanism so that high speeds are possible while still being characterized by smooth gradual action of the knife mechanism 51 and the transfer pads 55.

From the foregoing, it will be seen that neither cam follower 93 nor 108 (which determine the operation of the cut-off knives 58, 59 and the transfer pads 55, respectively) engages the cam surface 92b when the winding cycle is at any stage but in the final revolution of the bedroll 36. Also, the setscrews 88 and 103 are so adjusted as to prevent the trip latches 80 and 95 from travelling too far over center when the mechanism is latched. Otherwise, there would be contact of followers 93 and 108 with surface 92b. Further, the machine is so arranged that the bedroll knives 58 and 59 clear the core 53 and the mandrel 54 by about 1/16" when the mechanism is unlatched, i.e. in the FIG. 2 condition.

Summary of operation

When the bedroll blades 58 and 59 are opposite the chopper roll blade 64, one revolution of the bedroll 36 prior to the desired cut-off, the solenoid 116 is energized. Thereupon, the solenoid cam follower 121 is moved into extended position to trip the latches 89 and 109 (see FIG. 2). The latch 89 strikes cam follower 121 and rotates shaft 81, thereby moving latch 80 (see FIG. 15) out of engagement with cam follower 79. Thereupon, cam follower 91 (see FIG. 2) rests upon the inner surface 92a of cam 92.

Simultaneously with this, the spring 77 pivots the shaft 62 until the cam follower 93 rests upon the outer surface 92b of the cam 92.

Trip cam 109 of the transfer mechanism thereafter strikes the solenoid cam follower 121 to rotate the shaft 82 so as to move the trip latch 95 out of engagement with cam follower 112. Thereupon, the cam follower 111 contacts the inner surface 92a of the cam 92. The cam follower 108 is brought into engagement with the outer surface 92b of the cam 92 by virtue of the spring 105 pivoting the shaft 72.

At cut-off, the foam web snubber 65 holds the web W firmly against the cut-off blade 58. The chopper roll blades 64 passes between the bedroll blades 58 and 59, severing the web W at the transverse line of perforation provided by the perforator 34. The element 67 presses the severed web firmly onto the pins 56 of the body 60, and these pins 56 carry the severed web to the transfer point. At cut-off, however, as seen in FIG. 21, the pins 56 are already piercing the web before the web is actually severed.

Before transfer, the machine windage (air current) folds the severed web back over the pins 56 and the transfer pads 55 press the web firmly against glue strips on the core 53 and the mandrel 54.

Thereafter, the cam follower 91 follows the inner surface 92a of the cam 92 until it engages the relatch surface portion 92d, whereupon it gradually causes shaft 81 to rotate, moving trip latch 80 into engagement with cam follower 79, lifting cam follower 93 out of engagement with surface 92b. In like fashion, the cam follower 111 follows the inner surface 92a of the cam 92, rotating shaft 82 and moving trip latch 95 into engagement with cam follower 112, lifting cam follower 108 free of the surface 92b.

The cut-off, transfer, and actuating mechanisms just described are effective for both two-ply and singly ply-tissue and at speeds of rewinder operation in excess of 2,000 feet per minute. During this operation and with the cut-off knife mechanism 51 being actuated while the web W is in partial wrapping engagement with the bedroll 36 (i.e., ahead of the mandrel 54), the leading edge has been found to extend first radially relative to the bedroll, and thereafter, presumably under the combined stresses of centrifugal force and air resistance, folded back somewhat tangentially to develop the reverse fold condition depicted in FIG. 4.

Irrespective of the means employed to urge the fold against the bedroll, a cut-off is provided ahead of the mandrel 54 with the knife mechanism 51 issuing relatively slowly (compared with prior art operations) and also returning slowly, so that there is a significant reduction in shock to the bedroll and associated components to facilitate the achievement of maintenance-free operation of the rewinder at the high speeds indicated. Thereafter, each pad 55 issues again relatively slowly to urge the folded edge of the sheet onto the glued core with which the mandrel 54 is equipped.

It will be seen that there is provided an entirely new concept of web configuration during transfer. According to the invention, the side of the web next to the bedroll 36 is glued to the core. This means that the invention handles multi-ply webs as easily and consistently as single-ply webs. The invention also makes it possible to sever the web ahead of the mandrel 54 rather than right after the mandrel, as previously followed. This improvement provides the time to operate a cut-off mechanism at very high machine speeds with reasonable loads on the various parts. Thus, the web cut-off system which is extremely reliable may sever the web even if the web is not transversely perforated. In the particular illustration given, the chopper roll 49 and bedroll 36 are driven in precise synchronization, as by a gear train (not shown), making possible the reliable cut-off.

Also advantageous in the use of the invention are the pins 56 to hold the severed web W on the bedroll. The temporary maintenance of the web in place is overcome by pushing means made up of pads constructed advantageously of polyurethane foam extending between the two-tined units of the pins 56—a pair of pins 56 being aligned with each glue stripe on the core so that the pad 55 therebetween will be effective in adhesively uniting the web W to the core 53. It will also be noted that the cut-off knife mechanism 51 is a separately-operated member from the transfer pads 55 Thus, there is separate control of each operation, permitting best performance of each action independent of the other.

In the illustration given, the motion of the knife mechanism 51 and pins 56 and the transfer pads 55 occupies 270° of rotation of the bedroll 36, which makes the cut-off and transfer action very gentle and therefore suitable for high speed operation—in excess of 2,200 feet per minute. The followers 93 and 108 are 90° apart which causes transfer to lag cut-off by the same arcuate amount, thus eliminating use of two separate cams for the two operations—and permitting the wind effect to occur. During the remainder of the cycle of winding, the transfer elements are securely latched away from an operational condition While, in the foregoing specification, a detailed description of an embodiment of the invention has been set down for the purpose of illustration thereof, many variations in the details herein given may be made by those skilled in the art without departing from the spirit and scope of the invention.

We claim:

1. In web-winding apparatus equipped with a frame,
(A) a roll rotatably supported on said frame, means for rotating said roll, means for feeding a web onto said roll for travel therewith while in partial wrapping engagement with said roll,
(B) said frame also being equipped with a plurality of mandrels, means for moving said mandrels sequentially through a path in close proximity to the surface of said roll, the improvement comprising:
(C) means for transversely severing said web to provide a free leading edge on said web for approaching a mandrel on which said web is to be wound in said path, [and]
(D) *pin* means *extensibly mounted on said roll* for maintaining a web portion spaced from said edge in contact with said roll, *and pusher means extensibly mounted on said roll to urge said maintained web portion against an adjacent mandrel.*

2. In web-winding apparatus having a frame,
(A) a roll rotatably supported on said frame,
(1) means for rotating said roll,
(2) means for feeding a web onto said roll for travel therewith while in partial wrapping engagement with said roll,
(3) a longitudinal-extending recess in the surface of said roll,
(4) a cutting knife in said recess mounted for extension therefrom into cutting engagement with said web,
(B) a plurality of mandrels mounted on said frame,
(C) means for moving said mandrels sequentially through a segmental path in close proximity to the surface of said roll, and
(D) means for extending said knife at a time during the rotating of said roll to provide a folded free leading edge on said web during the web approach to a mandrel on which said web is to be wound in said path segment, and means for maintaining a web portion spaced from said edge in contact with said roll, *said roll being equipped with web pusher means spaced rearwardly in the direction of web travel from said knife, and means for extending said pusher means at a time during the rotation of said roll when said pusher means is positioned adjacent said path segment.*

[3. The apparatus of claim 2 in which said roll is equipped with web pusher means spaced rearwardly in the direction of web travel from said knife, and means for extending said pusher means at a time during the rotation of said roll when said pusher means is positioned adjacent said path segment.]

4. In web-winding apparatus having a frame,
(A) a roll rotatably supported on said frame, (1) means for rotating said roll,
(2) means for feeding a web onto said roll for travel therewith while in partial wrapping engagement with said roll,
(3) the roll having a longitudinally-extending slot in the surface thereof, said roll carrying a knife extendable out of said slot for cutting engagement with said web, (B) turret means rotatably supported on said frame,
(1) a plurality of mandrel mounted on said turret means, means for rotating said turret means to move said mandrels sequentially through an orbital path,
(2) said turret means being positioned on said frame relative to said roll to provide a segment of said orbital path in close proximity to the surface of said roll, (C) means on said frame for maintaining a severed web against said surface, (D) a pusher mounted in said roll for extension out of said slot to overcome said maintaining means, said pusher being mounted rearwardly of said knife in the direction of roll rotation, and means for sequentially extending said knife and pusher, said extending means being operative to extend said pusher at a time when said slot is aligned with said path segment.

5. The apparatus of claim 4 in which said extending means comprises cam followers for the extending of said knife. and pusher only during one predetermined roll revolution out of a plurality of revolutions constituting a winding cycle, said extending means further comprising means for positively locking said cam means during the remainder of said winding cycle.

6. In a rewinder having a frame, (A) a bedroll mounted for rotation in said frame,
(1) means for rotating said bedroll,
(2) means for feeding a web to said bedroll for travel therewith and in partial wrapping engagement therewith, (B) a plurality of elongated mandrels mounted on said frame disposed parallel to the length of said bedroll,
(1) means for selectively rotating said mandrels,
(2) means for moving said mandrels in a path having a path portion adjacent said bedroll whereby said web is adapted to be secured on a mandrel in said path portion, and (C) means for severing said web transversely to its direction of travel and at a position in the web travel prior to said path portion whereby said web presents a folded free leading edge in approaching a core-equipped mandrel in said path, said means including a longitudinally-extending slot in the surface of said bedroll, a cutting knife extensibly mounted in said slot, pin means extensibly mounted in said bedroll slot rearwardly in the direction of web travel from said knife, pusher means extensibly mounted in said bedroll slot, means in said bedroll for extending said knife, pin means and pusher means, and a chopper roll mounted for rotation on said frame, said chopper roll being equipped with longitudinally-extending, circumferentially spaced-apart, resilient pads for coaction with said knife and pin means, whereby said knife, pads and pin means coact to urge said web rearward of said free leading edge into contact with said bedroll for subsequent transfer by said pusher means.

7. In a rewinder having a frame, (A) a bedroll mounted for rotation in said frame,
(1) means for rotating said bedroll,
(2) means for feeding a web to said bedroll for travel therewith and in partial wrapping engagement therewith, (B) a pluarilty of elongated mandrels mounted on said frame disposed parallel to the length of said bedroll,
(1) means for selectively rotating said mandrels,
(2) means for moving said mandrels in a path having a path portion adjacent said bedroll whereby said web is adapted to be secured on a mandrel in said path portion, (C) a knife extendably mounted in said bedroll, pin means on said knife spaced rearwardly thereof in the direction of web travel, (D) means for extending said knife during the time said knife is approaching said path portion, (E) a chopper roll journaled in said frame for cooperative rotation with said web-wrapped bedroll, means on said chopper roll for urging said web por against said pin means, (F) pusher means extendably mounted on said bedroll longitudinally aligned with said pin means, and (G) means for extending said pusher means at a time when said pusher means is aligned with said path segment and during the same rotation of said web-wrapped bedroll in which said knife is extended.

8. The rewinder of claim 7 in which said pusher means includes an arm member positioned between pins constituting said pin means, and a resilient pad on said arm aligned with said pins.

9. The rewinder of claim 7 in which said pad is constructed of polyurethane foam.

10. The rewinder of claim 7 in which said means for extending said pusher means is equipped with means for retracting said pusher means, said knife-extending means and pusher means-retracting means being arranged to provide an elapsed time between initiation of knife extension and completion of pusher means retraction of from about ½ to ¾ of one revolution of said web-wrapped bedroll.

11. In a rewinder having a frame, (A) a bedroll mounted for rotation in said frame,
(1) means for rotating said bedroll,
(2) means for feeding a web to said bedroll for travel therewith and in partial wrapping engagement therewith, (B) a plurality of elongated mandrels mounted on said frame disposed parallel to the length of said bedroll,
(1) means for selectively rotating said mandrels,
(2) means for moving said mandrels in a path having a path portion adjacent said bedroll whereby said web is adapted to be secured on a mandrel in said path portion, (C) knife means extensibly mounted in said bedroll,
(1) said knife means including a pair of circumferentially spaced-apart, longitudinally-extending blades,
(2) said knife means including means for maintaining said web in contact with said bedroll, said maintaining means being spaced rearwardly of both of said knife blades in the direction of bedroll travel, (D) means for extending said knife blades during the time said knife blades are approaching said path portion, (E) a chopper roll journaled in said frame for cooperative rotation with said web-wrapped bedroll, a knife element in said chopper roll for cooperative action with said knife blades in said bedroll, (F) pusher means extensibly mounted in said bedroll and spaced rearwardly of said knife blades for overcoming said maintaining means, and (G) means for extending said pusher means at a time when said pusher means is aligned with said path segment.

12. The rewinder of claim 11 in which said frame is equipped with a cam having interior and exterior surfaces, said knife blade-extending means and said pusher means-extending means each including a cam follower for engagement with said exterior cam surface, a latching cam follower for each exterior surface cam follower, said latching cam followers being mounted for engagement with said interior cam surface, and electro-mechanical means for selectively engaging said cam followers with said interior and exterior cam surfaces.

13. In a method of rewinding webs, the steps of advancing a web in synchronism with a supporting roll, transversely severing said web to provide a folded free leading edge, and positioning a core-equipped mandrel in the path of the leading edge of said web, said web, rearwardly of said leading edge, being maintained against said supporting roll and thereafter urged outwardly from said roll against said mandrel.

14. In a method of winding a portion of a moving web upon a rotating core having adhesive areas on its periphery to form a roll thereon, the steps of (A) folding the advancing margin of said web back upon itself while in movement, and (B) exerting a force against that part of the web underlying said margin to press the same in an adhering union with the periphery of said core to initiate the winding of a roll thereon.

15. The method of claim 14 in which said web is a multi-ply web.

16. In a method of rewinding a lightweight paper tissue web at speeds of the order of 2,000 feet per minute, the steps of partially wrapping said web about a cut-off roll, positioning two mandrels adjacent said roll with each mandrel being operative to move through the same path, winding the web issuing from said roll about the mandrel forward in said path, when said forward mandrel has been wound to a predetermined extent transversely severing said web in the portion thereof wrapped on said roll whereby a free leading edge is provided on said web to approach the other of said mandrels, maintaining a portion of said web rearward of said leading edge against said roll to cause the web portion between said leading edge and said rearward portion to assume a reverse fold configuration, whereby a double web thickness is interposed between said other mandrel and roll, and urging said double web thickness against said other mandrel.

17. The method of claim 16 in which said web is a multi-ply web whereby the ply thereof in contact with said roll is also urged against said other mandrel.

18. In web-winding apparatus having a frame, a roll rotatably supported on said frame, means for rotating said roll, means for feeding a web onto said roll for travel therewith while in partial wrapping engagement with said roll, a longitudinally-extending recess in the surface of said roll, a cutting knife in said recess mounted for extension therefrom into cutting engagement with said web, a plurality of mandrels mounted on said frame, means for moving said mandrels sequentially through a segmental path in close proximity to the surface of said roll, means for extending said knife at a time during the rotating of said roll to provide a free leading edge on said web during the web approach to a mandrel on which said web is to be wound in said path segment, said roll being equipped with web pusher means spaced rearwardly in the direction of web travel from said knife, means for extetnding said pusher means at a time during the rotation of said roll when said pusher means is positioned adjacent said path segment, the means for sequentially extending said knife and pusher means including a cam follower for each of said knife and pusher means, cam means for said cam followers operative to sequentially move said cam followers at a predetermined time in a predetermined revolution of a rewinding cycle, and means for maintaining said cam followers out of contact with said cam means except during said predetermined revolution.

19. The apparatus of claim 18 in which said means for maintaining said cam followers out of contact and said cam means include latching means pivotally mounted on said roll, and solenoid means on said frame for unlatching said latching means.

20. In web-winding apparatus having a frame, a roll rotatably supported on said frame, means for rotating said roll, means for feeding a web onto said roll for travel therewith while in partial wrapping engagement with said roll, a longitudinally-extending recess in the surface of said roll, a cutting knife in said recess mounted for extension therefrom into cutting engagement with said web, a plurality of mandrels mounted on said frame, means for moving said mandrels sequentially through a segmental path in close proximity to the surface of said roll, means for extending said knife at a time during the rotating of said roll to provide a free leading edge on said web during the web approach to a mandrel on which said web is to be wound in said path segment, said roll being equipped with circumferentially spaced-apart knives, and a chopper roll rotatably mounted on said frame carrying a blade insertable between said spaced-apart knives.

References Cited

The following references, cited by the Examiner, are of record in the patented file of this patent or the original patent.

UNITED STATES PATENTS

| | | | |
|---|---|---|---|
| 2,200,905 | 5/1940 | Wood | 242—56 R |
| 2,237,759 | 4/1941 | Kwitek | 242—56 R |
| 2,512,900 | 6/1950 | Kwitek | 242—56.6 |
| 2,585,226 | 2/1952 | Christman | 242—56.6 |
| 2,950,873 | 8/1960 | Nelson | 242—56 A |
| 3,128,057 | 4/1964 | Barnhart et al. | 242—56 R |

FOREIGN PATENTS

| | | | |
|---|---|---|---|
| 587,197 | 11/1959 | Canada | 242—56 A |

GEORGE F. MAUTZ, Primary Examiner